United States Patent
Chang et al.

(10) Patent No.: US 8,248,229 B2
(45) Date of Patent: Aug. 21, 2012

(54) POWERLINE NETWORK SYSTEM HAVING DATA RELAY FUNCTION

(75) Inventors: Che-Cheng Chang, Tamshui Chen (TW); Hao-Jan Chiang, Tamshui Chen (TW); Chih-Pin Shih, Tamshui Chen (TW)

(73) Assignee: Acbel Polytech Inc., Taipei Hsien (TW)

( * ) Notice: Subject to any disclaimer, the term of this patent is extended or adjusted under 35 U.S.C. 154(b) by 493 days.

(21) Appl. No.: 12/572,657

(22) Filed: Oct. 2, 2009

(65) Prior Publication Data

US 2011/0080301 A1    Apr. 7, 2011

(51) Int. Cl.
*G08B 1/08* (2006.01)
(52) U.S. Cl. ............... 340/538; 340/12.32; 340/310.12
(58) Field of Classification Search .......... 340/538, 340/12.22, 12.32, 12.1, 12.31, 538.16, 531, 340/533, 310.12, 10.34
See application file for complete search history.

(56) References Cited

U.S. PATENT DOCUMENTS

| | | | |
|---|---|---|---|
| 3,927,404 A * | 12/1975 | Cooper | 340/518 |
| 6,370,396 B1 * | 4/2002 | Meiksin et al. | 455/560 |
| 6,677,743 B1 * | 1/2004 | Coolidge et al. | 324/126 |
| 7,050,831 B2 * | 5/2006 | Meiksin et al. | 455/560 |
| 7,142,094 B1 * | 11/2006 | Davidow et al. | 370/401 |

* cited by examiner

*Primary Examiner* — Daniel Previl
(74) *Attorney, Agent, or Firm* — C. G. Mersereau; Nikolai & Mersereau, P.A.

(57) ABSTRACT

A powerline network system having data relay function includes a plurality of power monitoring zones mutually connected with a powerline network and at least one repeater. Each of the power monitoring zones has at least one power monitoring device. The repeater is connected with each power monitoring device in two adjacent power monitoring zones through powerlines and has a first and a second relay units. The first and second relay units employ two different sets of transmitting and receiving bands to fetch data contained in powerline signals transmitted by each power monitor in adjacent power monitoring zones. The data are received by a relay unit are modulated with different transmitting band and then transmitted to powerlines of another power monitoring zone. The repeaters are not required to be serially connected to the powerlines, and incorrect data read can be also eliminated.

19 Claims, 4 Drawing Sheets

POWERLINE NETWORK SYSTEM HAVING DATA RELAY FUNCTION

BACKGROUND OF THE INVENTION

1. Field of the Invention

The present invention is related to a powerline network system, and more particularly to a powerline network system correctly transmitting data.

2. Description of the Related Art

The strength of powerline network communication mainly lies in the employment of presently deployed powerlines as the network medium for data transmission without requiring the deployment of additional network lines. Consequently, the expansion of powerline network facilitates the applications in association with widely scattering non-computerized network nodes.

Currently, numerous indoor and outdoor electric appliances embrace the development trend of computerization to provide more and more functions for better operational convenience. In collaboration with the powerline networking technology, remote surveillance or monitoring of the electric appliances, such as, LED street lights embedded with power monitoring function and energy meters having automated meter-reading functions, can be more easily realized.

Although powerline network can provide remote surveillance or monitoring using existing powerlines to monitor and control data, transmissions are prone to noise interference. When a remote site is far from local site, the effective data signal intensity is greatly attenuated, causing incorrect data to be read.

To improve transmission, an analog repeater is available. Such repeater is mainly deployed at every proper length of powerlines and serially connected with powerlines. The repeater amplifies the data signal contained in a power signal to ensure data correctness of data transmission performed between local site and remote site via powerlines. To amplify the data signal, such analog repeater must be serially connected to powerlines. However, serially connecting any repeater to existing powerlines is time-consuming and requires construction investment. Moreover, electronic components adopted in high-power powerline zone must be high-power electronic components capable of being operated in that environment, thereby increasing entire production cost of the powerline network infrastructure. Therefore, to enhance the reliability in powerline data transmission, an effective solution is required.

SUMMARY OF THE INVENTION

An objective of the present invention is to provide a powerline network communication system ensuring correct transmission and receipt of data and enhancing reliability of communication.

To achieve the foregoing objective, the powerline network communication system has a plurality of power monitoring zones and at least one repeater.

The plurality of power monitoring zones are connected with a powerline network. Each of the plurality of power monitoring zones has at least one power monitoring device.

Each of the at least one repeater is connected with the power monitoring devices in two adjacent power monitoring zones through powerlines and has a first relay unit and a second relay unit.

The first relay unit is connected with the at least one power monitoring device in one of the two adjacent power monitoring zones to fetch data transmitted from the at least one power monitoring device to the powerlines and output the data to the second relay unit. The first relay unit also receives and amplifies the data transmitted from the second relay unit and modulates the data with a first frequency band to transmit the data to the powerlines;

The second relay unit is connected with the first relay unit to transmit data thereto and receive data therefrom and is connected with the at least one power monitoring device in the other one of the two adjacent power monitoring zones through powerlines to fetch data transmitted from the at least one power monitoring device to powerlines. The second relay unit also receives and amplifies the data transmitted from the first relay unit, and modulates the data with a second frequency band to transmit the data to the powerlines. The first frequency band and the second frequency band are not the same.

The repeater of the present invention employs the first relay unit having one modulation frequency and the second relay unit having another modulation frequency to fetch data contained in powerline signals transmitted by each power monitor in adjacent power monitoring zones. The data are received by a relay unit are modulated with different transmitting band and then transmitted to the powerlines of another power monitoring zone. Therefore, it is unnecessary for the repeaters to be serially connected to the powerlines. Not only can the incorrect read issue occurring when data are transmitted over long distance be avoided, but also signal interference of adjacent power monitoring zones is eliminated.

DETAILED DESCRIPTION OF THE INVENTION

Figure 1:
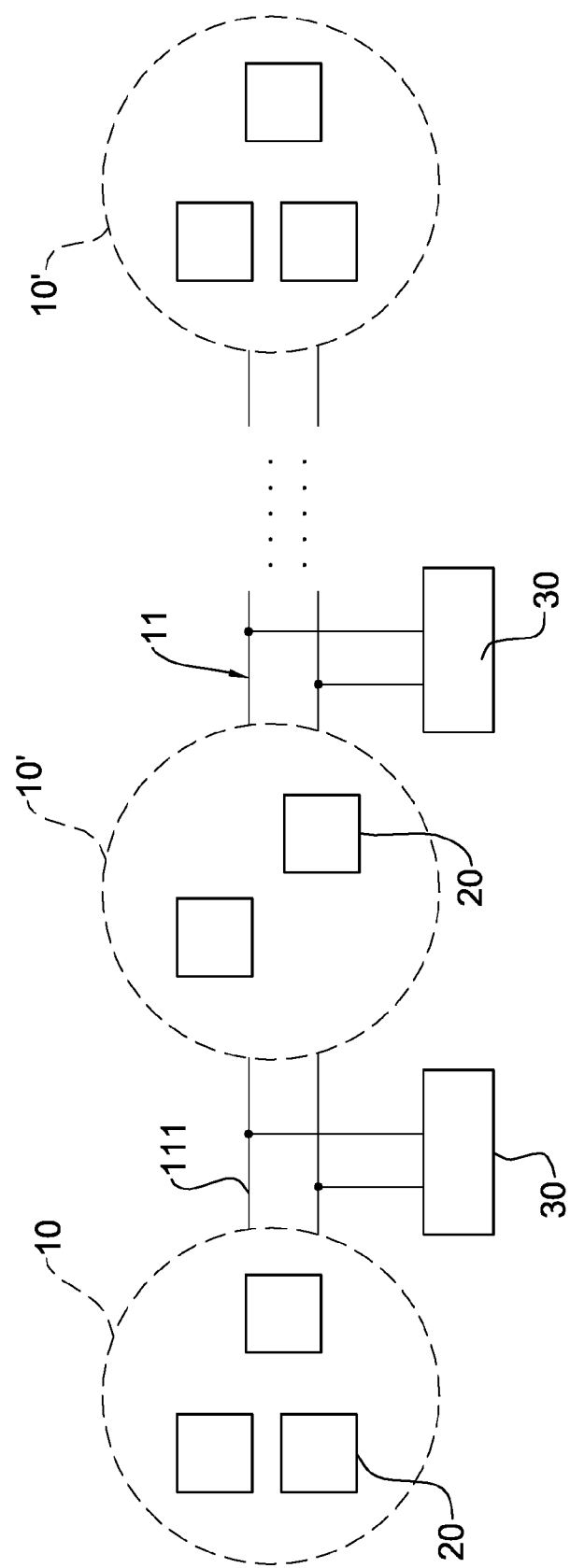
FIG. 1 is a system architecture diagram of a powerline network communication system in accordance with the present invention.

With reference to FIG. 1, a powerline network system in accordance with the present invention includes a plurality of power monitoring zones (10)(10') and at least one repeater (30). The plurality of power monitoring zones (10)(10') are connected with a powerline network (11) to supply the working power. Also, each power monitoring zone (10)(10') has at least one power monitoring device (20). Each repeater (30) is connected with two adjacent power monitoring zones (10)(10'). In other words, the power monitoring devices (20) in two adjacent power monitoring zones (10)(10') are mutually connected through powerlines.

Figure 2:
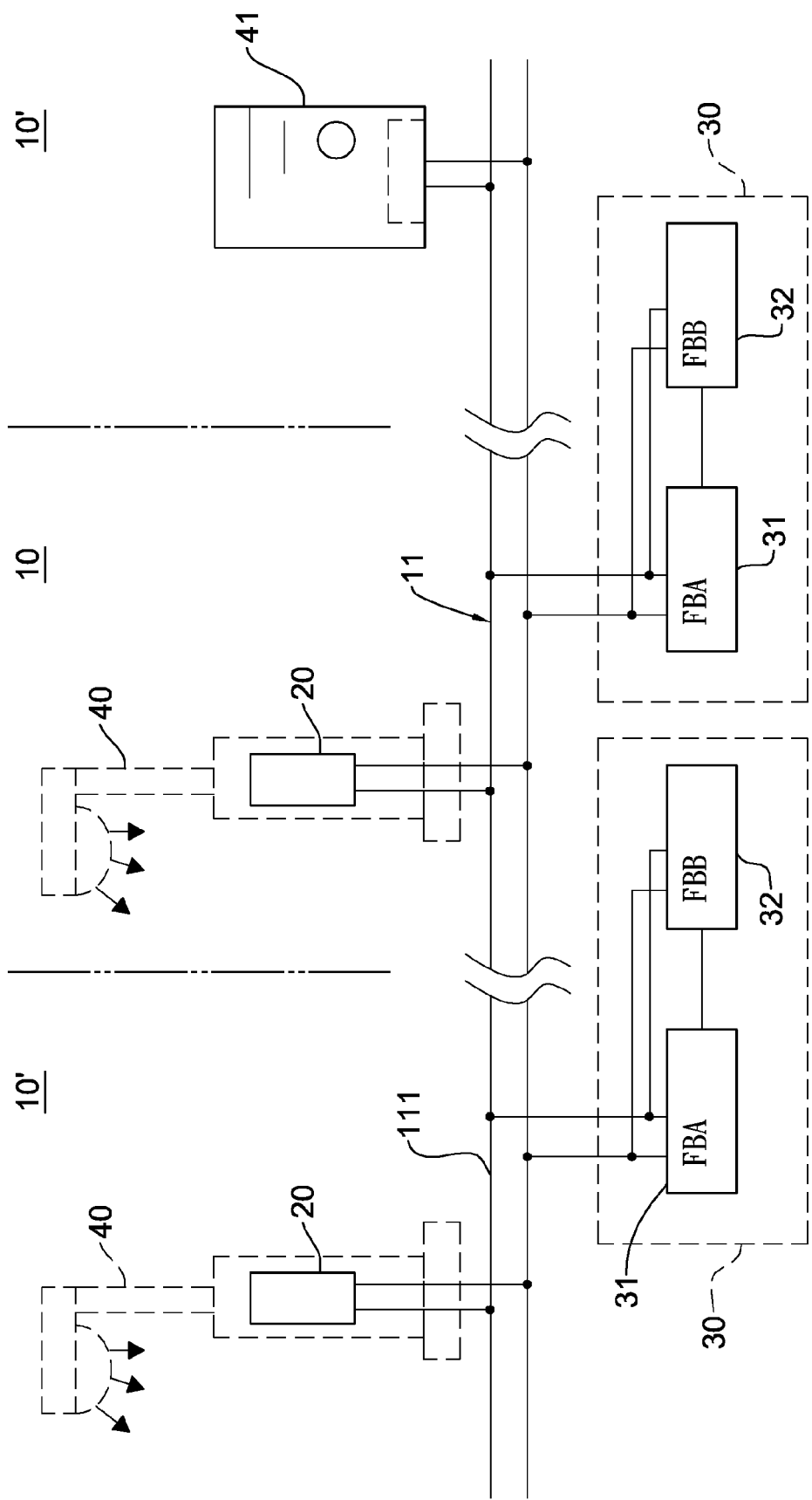
FIG. 2 is a system architecture diagram of the powerline network communication system of the present invention adapted to power monitoring of street lights.
Figure 3:
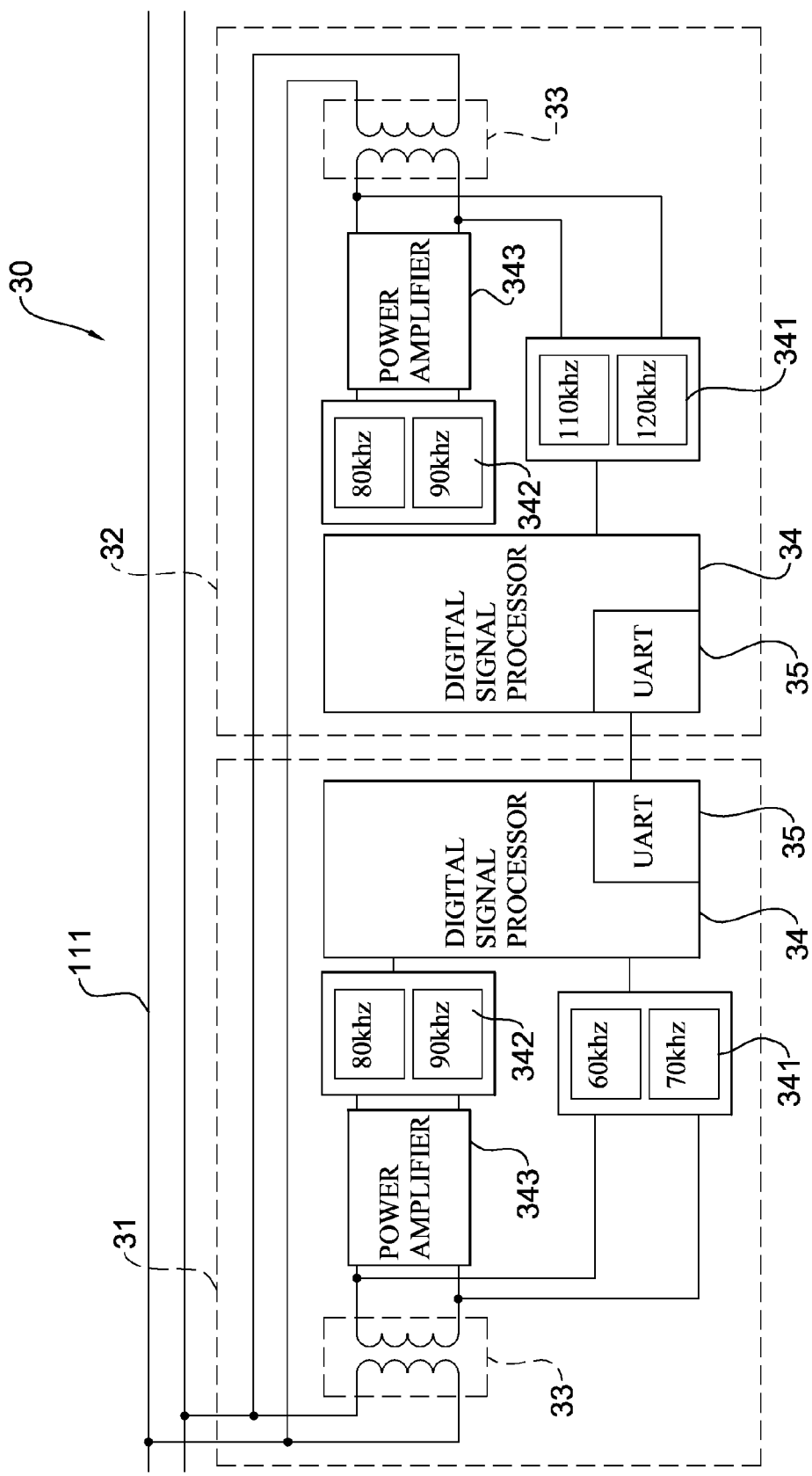
FIG. 3 is a block diagram of a repeater of the present invention.

With reference to FIGS. 2 and 3, a preferred embodiment of a powerline network system of the present invention is applied to the power management of street lights. Each repeater (30) has a first relay and a second relay units (31)(32).

The first relay unit (31) is connected to at least one power monitoring device (20) of a power monitoring zone (10) in neighboring power monitoring zones (10)(10') through a powerline (111) to fetch data transmitted from the at least one power monitoring device (20) to the powerline (111). The first relay unit (31) also receives data transmitted from the second relay unit (32). The received data signal is amplified and modulated with a frequency band A (FBA) to transmit to the powerline (111).

The second relay unit (32) is connected with the first relay unit (31) to transmit and receive data. The second relay unit (32) is connected with at least one power monitoring device (20) in a power monitoring zone (10') of neighboring power monitoring zones (10)(10') through a powerline (111) to fetch data transmitted from the at least one power monitoring device (20) to the powerline (111) and then output the data to the first relay unit (31). Also, data transmitted from the first relay unit (31) and received by the second relay unit (32) are amplified and then modulated with a frequency band B (FBB) to transmit to the powerline (111). The FBA and FBB are not the same. For example, the FBA may be a band in a range of 60~90 kHz, in which 60 kHz and 70 kHz serve as receiving frequencies and 80 kHz and 90 kHz serve as transmitting frequencies, and vice versa. The FBB may be a band in a range of 110~140 kHz, in which 110 kHz and 120 kHz serve as receiving frequencies and 130 kHz and 140 kHz serve as transmitting frequencies, and vice versa. Hence, when two power monitoring devices (20) of two adjacent power monitoring zones (10)(10') perform full-duplex communication, the powerlines connected with the power monitoring devices (20) could contain data signals with up to four different frequencies so as to lower the signal interference to a minimum.

Each of the first and second relay units (31) (32) has a transformer (33), a digital signal processor (34) and a digital communication interface (35).

The transformer (33) serves to couple with the powerline (111). The input terminal of the digital signal processor (34) is electrically connected to the transformer (33) through two filters (341) to receive external data signals modulated with two different frequencies. The output terminal of the digital signal processor (34) is electrically connected to the transformer (33) through two second filters (342) and a power amplifier (343) to process and modulate the data. The transformer (33) is coupled with the powerline (111) to transmit data signals modulated with two different frequencies. The first filters (341) pertain to a band pass filter, and the band pass frequencies thereof respectively correspond to two different receiving frequencies. The second filters (342) pertain to a low pass filter, and the low pass frequencies respectively correspond to two different transmitting frequencies. The digital communication interface (35) serves to connect with a counterpart having an identical communication standard to receive data therefrom or transmit data thereto. In the present embodiment, the digital communication interface (35) is UART or one of serial communication interfaces, such as, RS232, USB and so forth. The UART interface may be directly integrated into the digital signal processor (34).

The repeater (30) of the present invention employs one of the first and second relay units (31)(32) configured for two different frequency bands (FBA and FBB) to fetch a power data signal transmitted from each power monitoring device (20) in neighboring power monitoring zones (10)(10') and the other one of the first and second relay units (31)(32) to receive the corresponding power data, modulate the power data with another frequency and transmit the corresponding power data signal to a powerline (111) of another power monitoring zone. As a result, not only can the incorrect read issue occurring when data are transmitted over long distance be avoided, but also signal interference of adjacent power monitoring zones is eliminated.

Figure 4:
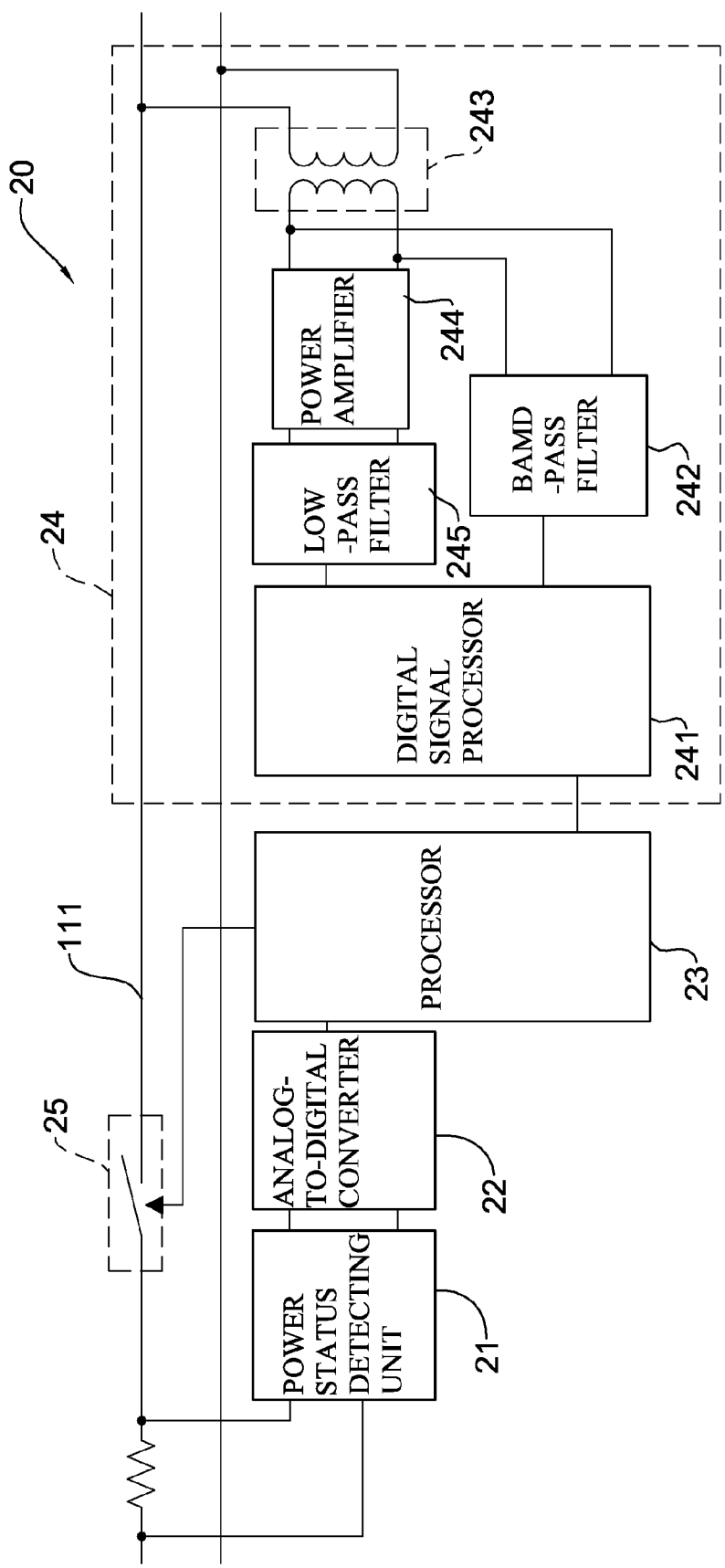
FIG. 4 is a block diagram of a power monitoring device of the present invention.

With reference to FIGS. 2 and 4, a power monitoring device adapted to street lights (40) in accordance with the present invention has a power status detecting unit (21), an analog-to-digital converter (ADC) (22), a processor (23), a powerline communication module (24), and a protection circuit (25).

The power status detecting unit (21) is coupled to a powerline (111) to acquire and then output the voltage and current status of the powerline (111). The ADC (22) is connected to an output terminal of the power status detecting unit (21) to convert the inputted analog detection signals into digital signals and then output the digital signals. The processor (23) is connected with an output terminal of the ADC (22) to acquire the voltage and current values therefrom.

The powerline communication module (24) is connected with the processor (23) to acquire the voltage and current values outputted from the processor (23), modulate the voltage and current values into analog signals, and then transmit the analog signals to the powerline (111). The powerline communication module (24) also receives analog signals on the powerline (111), fetches data contained therein, and outputs the data to the processor (23). The employed modulation frequency band above corresponds to the frequency band (FBA/FBB) of the corresponding relay unit in the pertaining power monitoring zone. In the present embodiment, the structure of the powerline communication module (24) is the same as that of the first and second relay units and has a digital signal processor (241), a first filter (242), a transformer (243), a power amplifier (244) and a second filter (245). The protection circuit (25) is serially connected with the powerline (111). The control terminal is connected to the output terminal of the processor (23). Depending on the received data, the processor (23) switches on or off the protection circuit (25). In the present embodiment, the protection circuit (25) is a power switch.

The power monitoring device (20) for street light detects the power usage status of a street light (40) through the power status detecting unit (21). Given a power management terminal (41) deployed at other power monitoring zone (10'), power signals transmitted through the power communication module (24) are received by the repeater (30) in the pertaining power monitoring zone (10) of an adjacent street light (40). The power data contained in the power signals are fetched by one relay unit through the corresponding frequency band and modulated by the other relay unit with another frequency band to generate a power signal and transmit the power signal to other power monitoring zone. At last, the power signal is relayed to the power management terminal (41). If detecting irregular power operating in the street light (40), the power management terminal (41) modulates a power-off command data and transmit a corresponding signal to the powerline (111) through the powerline network (11). Similarly, processed by the repeater (30), the power-off command is smoothly transmitted to the processor (23) of the power monitoring device (20) in the corresponding street light (40). After the processor (23) receives the power-off command, the protection circuit is activated to temporarily power off the street light.

In sum, powerline signals can be read digitally and can be carried through powerlines with different carrier frequency bands. As power monitors separated distantly on powerline network can all correctly and mutually acquire data after the data are processed through the repeater, the incorrect data read issue caused by the frequent noise interference during transmission through powerlines can be prevented. Furthermore, the repeaters of the present invention are unnecessarily connected with powerlines in series, thereby eliminating the effort-taking and time-consuming process for altering existing powerlines. As such, the present invention is ideal for the application of power monitoring points for street lights or energy meters.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A powerline network system having data relay function, comprising:
    a plurality of power monitoring zones connected with a powerline network, and each having at least one power monitoring device; and
    at least one repeater, each connected with the power monitoring devices in two adjacent power monitoring zones through powerlines and having a first relay unit and a second relay unit; wherein
    the first relay unit is connected with the at least one power monitoring device in one of the two adjacent power monitoring zones to fetch data transmitted from the at least one power monitoring device to powerlines and output the data to the second relay unit, and receives and amplifies the data transmitted from the second relay unit and modulates the data with a first frequency band to transmits the data to powerlines;
    the second relay unit is connected with the first relay unit to transmit data thereto and receive data therefrom and is connected with the at least one power monitoring device in the other one of the two adjacent power monitoring zones through powerlines to fetch data transmitted from the at least one power monitoring device to powerlines, receives and amplifies the data transmitted from the first relay unit, and modulates the data with a second frequency band to transmit the data to powerlines, the first frequency band and the second frequency band are not the same.

2. The powerline network system having data relay function as claimed in claim 1, wherein the first and second frequency bands respectively have two receiving frequencies and two transmitting frequencies.

3. The powerline network system having data relay function as claimed in claim 2, wherein each of the first and second relay units has:
    a transformer coupled to the powerlines;
    a digital signal processor having an input terminal electrically connected to the transformer through a first filter to acquire external data signals of the powerlines, and an output terminal electrically connected to the transformer through a second filter and a power amplifier, so as to process and modulate the data and transmit the data to the powerlines through the transformer coupled to the powerlines; and
    a digital communication interface serving to connect with a counterpart having an identical communication standard to receive data therefrom or transmit data thereto.

4. The powerline network system having data relay function as claimed in claim 3, wherein
    the first filter of the first relay unit is a band pass filter, and a band pass frequency band thereof corresponds to one of the two receiving frequencies of the first relay unit; and
    the first filter of the second relay unit is a band pass filter, and a band pass frequency of the first filter of the second relay unit corresponds to the two receiving frequencies of the second relay unit.

5. The powerline network system having data relay function as claimed in claim 4, wherein the digital communication interface is integrated in the digital signal processor.

6. The powerline network system having data relay function as claimed in claim 5, wherein each power monitoring device comprises:
    a power status detecting unit coupled to powerlines to acquire and then output analog voltage and current signals therefrom and having an output terminal;
    an analog-to-digital converter connected to the output terminal of the power status detecting unit to convert the analog voltage and current signals into digital voltage and current values and output the voltage and current values, and having an output terminal;
    a processor connected to the output terminal of the analog-to-digital converter to acquire the voltage and current values;
    a powerline communication module connected to the processor to acquire the voltage and current values outputted from the processor, modulate the voltage and current values into analog signals with a modulation frequency corresponding to one of the transmitting frequencies of the corresponding relay unit in the pertaining power monitoring zone and transmit the analog signals to the powerlines, receiving analog signals from the powerlines, fetching and outputting data contained therein to the processor; and
    a protection circuit serially connected to a powerline and having a control terminal connected to an output terminal of the processor for the processor to switch on or off the protection circuit in accordance with external data received by the processor.

7. The powerline network system having data relay function as claimed in claim 2, wherein each power monitoring device comprises:
    a power status detecting unit coupled to powerlines to acquire and then output analog voltage and current signals therefrom and having an output terminal;
    an analog-to-digital converter connected to the output terminal of the power status detecting unit to convert the analog voltage and current signals into digital voltage and current values and output the voltage and current values, and having an output terminal;
    a processor connected to the output terminal of the analog-to-digital converter to acquire the voltage and current values;
    a powerline communication module connected to the processor to acquire the voltage and current values outputted from the processor, modulate the voltage and current values into analog signals with a modulation frequency corresponding to one of the transmitting frequencies of the corresponding relay unit in the pertaining power monitoring zone and transmit the analog signals to the powerlines, receiving analog signals from the powerlines, fetching and outputting data contained therein to the processor; and
    a protection circuit serially connected to a powerline and having a control terminal connected to an output terminal of the processor for the processor to switch on or off the protection circuit in accordance with external data received by the processor.

8. The powerline network system having data relay function as claimed in claim 3, wherein each power monitoring device comprises:
- a power status detecting unit coupled to powerlines to acquire and then output analog voltage and current signals therefrom and having an output terminal;
- an analog-to-digital converter connected to the output terminal of the power status detecting unit to convert the analog voltage and current signals into digital voltage and current values and output the voltage and current values, and having an output terminal;
- a processor connected to the output terminal of the analog-to-digital converter to acquire the voltage and current values;
- a powerline communication module connected to the processor to acquire the voltage and current values outputted from the processor, modulate the voltage and current values into analog signals with a modulation frequency corresponding to one of the transmitting frequencies of the corresponding relay unit in the pertaining power monitoring zone and transmit the analog signals to the powerlines, receiving analog signals from the powerlines, fetching and outputting data contained therein to the processor; and
- a protection circuit serially connected to a powerline and having a control terminal connected to an output terminal of the processor for the processor to switch on or off the protection circuit in accordance with external data received by the processor.

9. The powerline network system having data relay function as claimed in claim 4, wherein each power monitoring device comprises:
- a power status detecting unit coupled to powerlines to acquire and then output analog voltage and current signals therefrom and having an output terminal;
- an analog-to-digital converter connected to the output terminal of the power status detecting unit to convert the analog voltage and current signals into digital voltage and current values and output the voltage and current values, and having an output terminal;
- a processor connected to the output terminal of the analog-to-digital converter to acquire the voltage and current values;
- a powerline communication module connected to the processor to acquire the voltage and current values outputted from the processor, modulate the voltage and current values into analog signals with a modulation frequency corresponding to one of the transmitting frequencies of the corresponding relay unit in the pertaining power monitoring zone and transmit the analog signals to the powerlines, receiving analog signals from the powerlines, fetching and outputting data contained therein to the processor; and
- a protection circuit serially connected to a powerline and having a control terminal connected to an output terminal of the processor for the processor to switch on or off the protection circuit in accordance with external data received by the processor.

10. The powerline network system having data relay function as claimed in claim 1, wherein the first and second relay units respectively have
- a transformer coupled to powerlines;
- a digital signal processor having
- an input terminal electrically connected to the transformer through a first filter to acquire a data signal of powerlines; and
- an output terminal electrically connected to the transformer through a second filter and a power amplifier, so as to process and modulate the data signal and transmit the data signal to powerlines through the transformer coupled to powerlines; and
- a digital communication interface serving to connect digital communication interfaces with an identical communication standard so as to transmit and receive data.

11. The powerline network system having data relay function as claimed in claim 10, wherein
- the first filter of the first relay unit is a band pass filter, and a band pass frequency band thereof corresponds to one of the two receiving frequencies of the first relay unit; and
- the first filter of the second relay unit is a band pass filter, and a band pass frequency of the first filter of the second relay unit corresponds to the two receiving frequencies of the second relay unit.

12. The powerline network system having data relay function as claimed in claim 11, wherein the digital communication interface is integrated in the digital signal processor.

13. The powerline network system having data relay function as claimed in claim 12, wherein the digital communication interface is one of UART, RS232 and USB interfaces.

14. The powerline network system having data relay function as claimed in claim 13, wherein the first frequency band is in a range of 60-90 kHz, and the second frequency band is in a range of 110-140 kHz.

15. The powerline network system having data relay function as claimed in claim 14, wherein the two receiving frequencies of the first frequency band are 60 kHz and 70 kHz, the two transmitting frequencies of the first frequency band are 80 kHz and 90 kHz, the two receiving frequencies of the second frequency band are 110 kHz and 120 kHz, and the two transmitting frequencies of the second frequency band are 130 kHz and 140 kHz.

16. The powerline network system having data relay function as claimed in claim 10, wherein each power monitoring device comprises:
- a power status detecting unit coupled to powerlines to acquire and then output analog voltage and current signals therefrom and having an output terminal;
- an analog-to-digital converter connected to the output terminal of the power status detecting unit to convert the analog voltage and current signals into digital voltage and current values and output the voltage and current values, and having an output terminal;
- a processor connected to the output terminal of the analog-to-digital converter to acquire the voltage and current values;
- a powerline communication module connected to the processor to acquire the voltage and current values outputted from the processor, modulate the voltage and current values into analog signals with a modulation frequency corresponding to one of the transmitting frequencies of the corresponding relay unit in the pertaining power monitoring zone and transmit the analog signals to the powerlines, receiving analog signals from the powerlines, fetching and outputting data contained therein to the processor; and
- a protection circuit serially connected to a powerline and having a control terminal connected to an output terminal of the processor for the processor to switch on or off the protection circuit in accordance with external data received by the processor.

17. The powerline network system having data relay function as claimed in claim 11, wherein each power monitoring device comprises:
- a power status detecting unit coupled to powerlines to acquire and then output analog voltage and current signals therefrom and having an output terminal;
- an analog-to-digital converter connected to the output terminal of the power status detecting unit to convert the analog voltage and current signals into digital voltage and current values and output the voltage and current values, and having an output terminal;
- a processor connected to the output terminal of the analog-to-digital converter to acquire the voltage and current values;
- a powerline communication module connected to the processor to acquire the voltage and current values outputted from the processor, modulate the voltage and current values into analog signals with a modulation frequency corresponding to one of the transmitting frequencies of the corresponding relay unit in the pertaining power monitoring zone and transmit the analog signals to the powerlines, receiving analog signals from the powerlines, fetching and outputting data contained therein to the processor; and
- a protection circuit serially connected to a powerline and having a control terminal connected to an output terminal of the processor for the processor to switch on or off the protection circuit in accordance with external data received by the processor.

18. The powerline network system having data relay function as claimed in claim 12, wherein each power monitoring device comprises:
- a power status detecting unit coupled to powerlines to acquire and then output analog voltage and current signals therefrom and having an output terminal;
- an analog-to-digital converter connected to the output terminal of the power status detecting unit to convert the analog voltage and current signals into digital voltage and current values and output the voltage and current values, and having an output terminal;
- a processor connected to the output terminal of the analog-to-digital converter to acquire the voltage and current values;
- a powerline communication module connected to the processor to acquire the voltage and current values outputted from the processor, modulate the voltage and current values into analog signals with a modulation frequency corresponding to one of the transmitting frequencies of the corresponding relay unit in the pertaining power monitoring zone and transmit the analog signals to the powerlines, receiving analog signals from the powerlines, fetching and outputting data contained therein to the processor; and
- a protection circuit serially connected to a powerline and having a control terminal connected to an output terminal of the processor for the processor to switch on or off the protection circuit in accordance with external data received by the processor.

19. The powerline network system having data relay function as claimed in claim 1, wherein each power monitoring device comprises:
- a power status detecting unit coupled to powerlines to acquire and then output analog voltage and current signals therefrom and having an output terminal;
- an analog-to-digital converter connected to the output terminal of the power status detecting unit to convert the analog voltage and current signals into digital voltage and current values and output the voltage and current values, and having an output terminal;
- a processor connected to the output terminal of the analog-to-digital converter to acquire the voltage and current values;
- a powerline communication module connected to the processor to acquire the voltage and current values outputted from the processor, modulate the voltage and current values into analog signals with a modulation frequency corresponding to one of the transmitting frequencies of the corresponding relay unit in the pertaining power monitoring zone and transmit the analog signals to the powerlines, receiving analog signals from the powerlines, fetching and outputting data contained therein to the processor; and
- a protection circuit serially connected to a powerline and having a control terminal connected to an output terminal of the processor for the processor to switch on or off the protection circuit in accordance with external data received by the processor.

* * * * *